No. 777,225. PATENTED DEC. 13, 1904.
J. SCOTT.
DRIER.
APPLICATION FILED APR. 23, 1904.
NO MODEL. 3 SHEETS—SHEET 1.

Witnesses
Geo. W. Young.
R. J. Parsch.

Inventor
John Scott
By H. G. Underwood
Attorneys

No. 777,225. PATENTED DEC. 13, 1904.
J. SCOTT.
DRIER.
APPLICATION FILED APR. 23, 1904.
NO MODEL. 3 SHEETS—SHEET 2.

Witnesses
Geo. W. Young.
P. J. Barsch.

Inventor:
John Scott
By H. G. Underwood
Attorney

No. 777,225. PATENTED DEC. 13, 1904.
J. SCOTT.
DRIER.
APPLICATION FILED APR. 23, 1904.
NO MODEL. 3 SHEETS—SHEET 3.
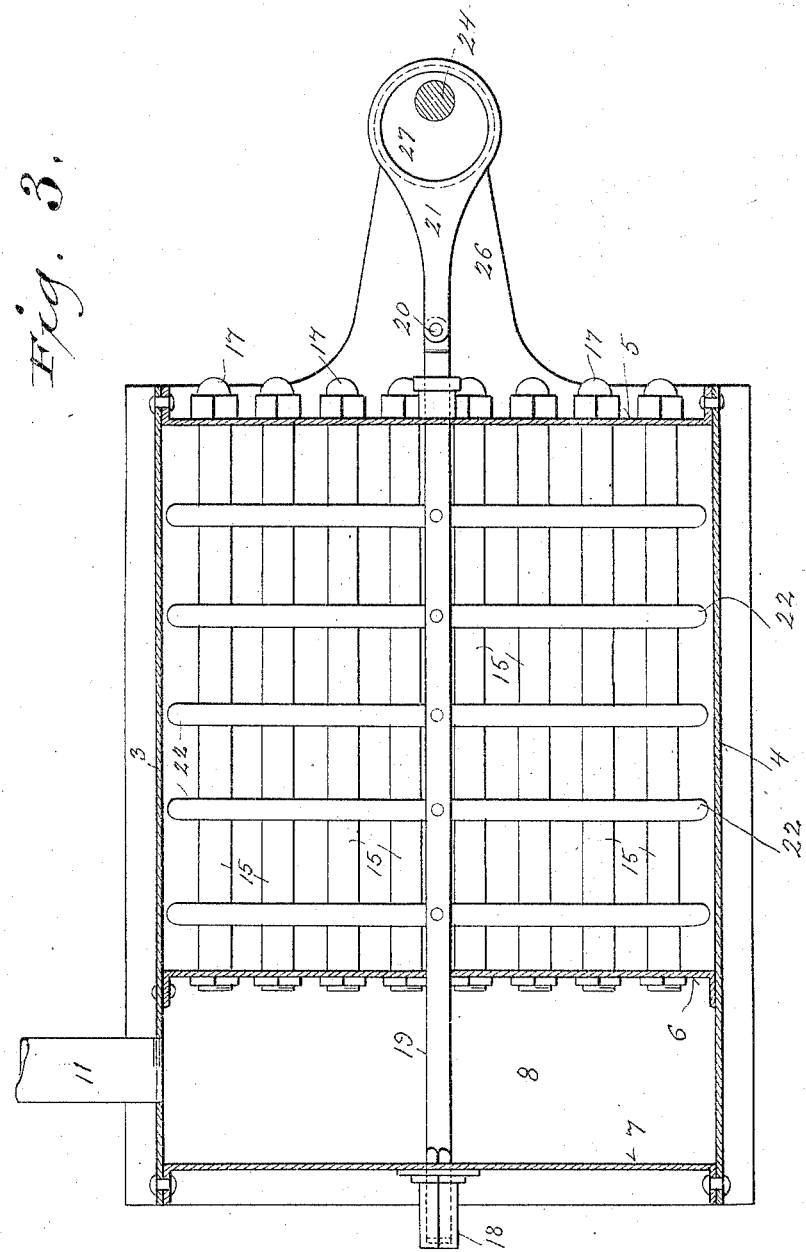
Witnesses
Geo. W. Young.
R. J. Rasch.
Inventor
John Scott
By H. G. Underwood
Attorneys No. 777,225. Patented December 13, 1904.

UNITED STATES PATENT OFFICE.

JOHN SCOTT, OF MILWAUKEE, WISCONSIN, ASSIGNOR OF ONE-HALF TO EDWARD P. MUELLER, OF MILWAUKEE, WISCONSIN.

DRIER.

SPECIFICATION forming part of Letters Patent No. 777,225, dated December 13, 1904.

Application filed April 23, 1904. Serial No. 204,563. (No model.)

*To all whom it may concern:*

Be it known that I, JOHN SCOTT, a citizen of the United States, and a resident of Milwaukee, in the county of Milwaukee and State of Wisconsin, have invented certain new and useful Improvements in Driers; and I do hereby declare that the following is a full, clear, and exact description thereof.

My invention has especial reference to machines for drying wet grains, though adapted for all kinds of grain-drying; and it consists in certain peculiarities of construction and combination of parts, as will be fully set forth hereinafter, in connection with the accompanying drawings, and subsequently claimed.

Figure 1:
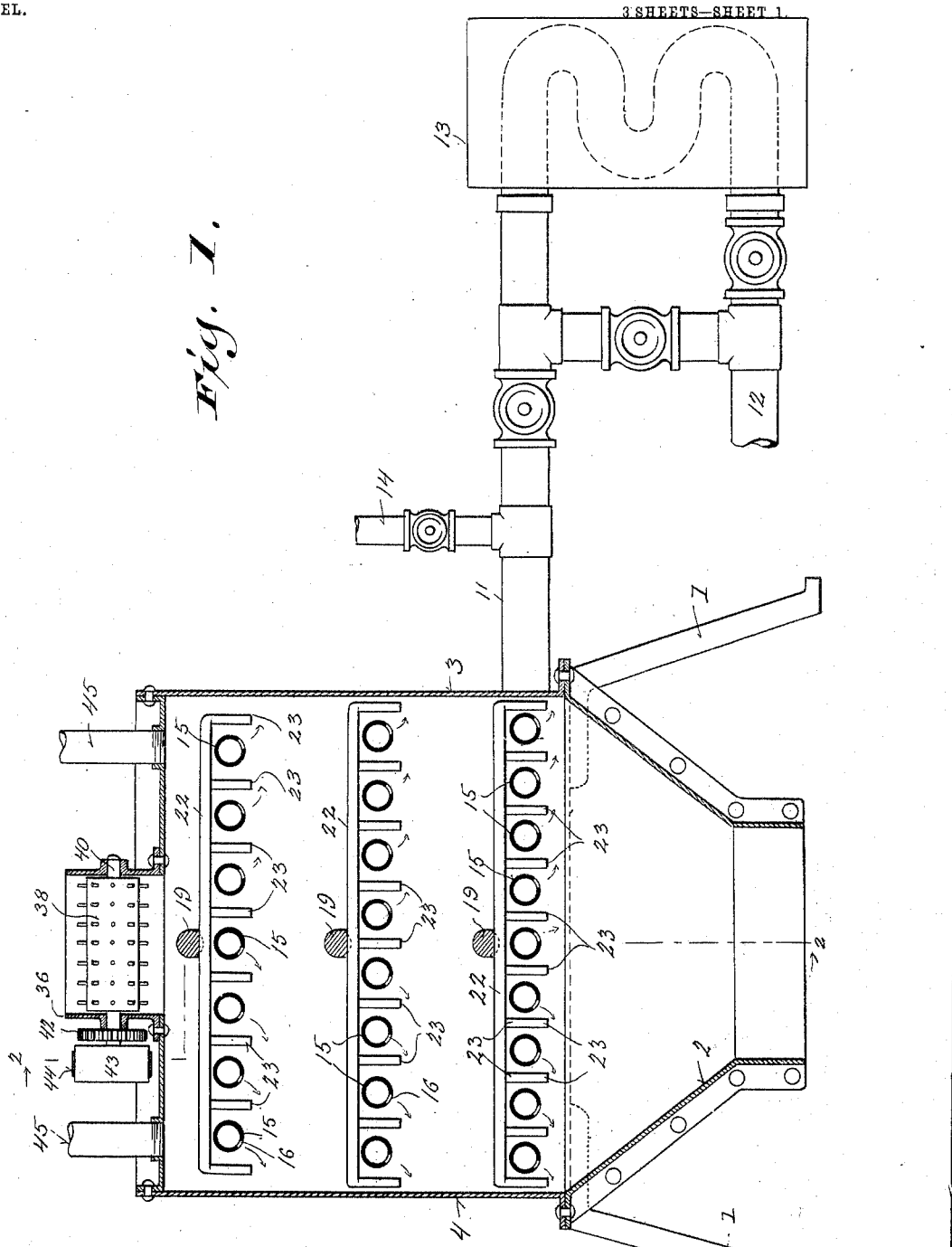
Figure 2:
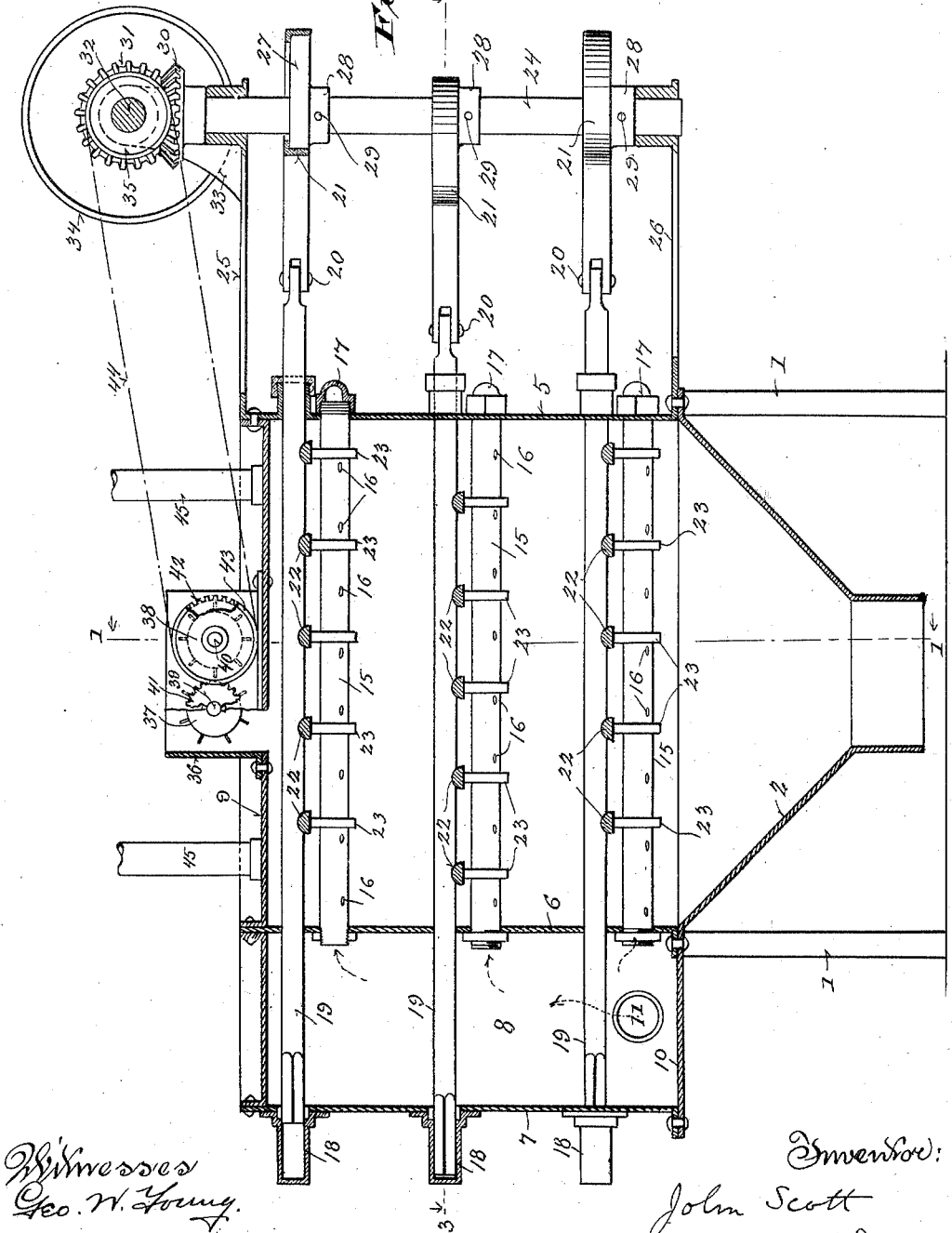

In the said drawings, Figure 1 is a vertical transverse sectional view taken on the plane indicated by the line 1 1 in Fig. 2, Fig. 2 is a vertical longitudinal sectional view taken on the plane indicated by the line 2 2 in Fig. 1, and Fig. 3 is a horizontal sectional view taken on the plane indicated by the line 3 3 in Fig. 2, of a machine embodying my present invention.

Referring by numerals to the drawings, 1 1 indicate suitable legs or standards which support the drier proper and elevate same sufficiently to afford space for the delivery-hopper 2, secured to and depending from the lower flanges of the casing of the drier. The casing comprises two side walls 3 4, a front end wall 5, and rear end wall 6 of the drier proper, beyond which the said side walls extend to the rear end wall 7 of the structure, thus forming a hot-air chamber 8 between the described end walls 6 7. The casing also includes a horizontal top wall 9, covering the entire drier and hot-air chamber 8, and a bottom wall 10, forming the floor of the said chamber.

11 designates a pipe which conveys hot air to the chamber 8 of the apparatus from any suitable source of supply, the particular construction of the pipe and connections forming no part of my present invention; but in Fig. 1 I have indicated a cold-air pipe 12, leading to a heater 13, within which said pipe is formed into a series of coils and emerges as said hot-air pipe 11. There are various valve-controlled branches to said pipe and a valve-controlled steam-pipe 14, all these being useful in the various applications of my invention.

Rows of pipes 15 15, arranged horizontally, extend between the drier-walls 5 6, there being three series of said rows shown in the drawings, but the number being immaterial. Below the central line of said pipes they are formed with rows of small perforations 16 16. The number of pipes in each row is not material, but by preference the number increases in each successive row downward, as shown. These pipes are open at their inner ends, where they project into the hot-air chamber 8; but their outer ends beyond the end wall 5 are closed by caps 17. The extreme rear end wall 7 is perforated and supplied with a series of guide-sockets 18 18 for the reception of the rear ends of a series of rods 19 19, whose forward ends project through suitably-packed openings in the front wall 5 and are pivoted, as shown at 20, to eccentric-straps 21. Secured to the under side of the rods 19 are rows of transverse strips 22, from which depend series of teeth 23, adjacent to the pipes 15, the rods, strips, and teeth forming, in effect, rakes which are reciprocated over the material on the pipes, as hereinafter described.

24 designates a vertical shaft supported by suitable bearings on plates 25 26, projecting from the front wall of the drier, said shaft having a series of eccentrics 27 27 mounted thereon and held in place by means of set-screws 29, extending through the eccentric-hubs 28, said eccentrics fitting within their described straps 21. A miter-gear pinion 30 is secured to the top of said vertical shaft 24 and meshes with a like pinion 31, fast on a horizontal shaft 32, supported in bearings 33 on the upper plate 25. Fast on the shaft 32 are the main drive-pulley 34 and a smaller pulley 35.

36 represents the hopper on top of the drier, and inasmuch as wet grains are often matted together it is desirable to provide means for separation of the mass. Hence I place within the hopper two cylinders 37 38, armed with teeth or pins, and on the journals of these cylinders I place gears 41 42, which mesh with each other. The journal 40 of the larger cylinder 38 carries the larger gear 42 and also a pulley 43, from which a belt 44 extends to and around the pulley 35 on the shaft 32. The gear 42 turns the smaller gear 41, and thus the cylinder 37, and as the material to be dried is passed between the two cylinders (the smaller one turning more rapidly than the other) the teeth on these cylinders tear the matted mass apart, so it is finely divided when delivered from the hopper 36 upon the upper row of perforated pipes 15, and the material is spread out by the rakes formed of the rods 19, strips 22, and teeth 23 evenly to form a thin film on and over said pipes and be thereby dried by the hot air escaping from said pipes and still further broken up by the rake-teeth, so as to fall on the next series of pipes and be further dried, and so on. There are series of pipes 45 45, communicating with the drier through the upper wall 9, and these serve as ventilating-pipes and can also be connected with water-pipes if it is desired at any time to flush and clean out the drier.

By having the perforations 16 placed below the longitudinal centers of the pipes 15 and at one side of their vertical centers the hot air escapes obliquely downward, as indicated by the arrows in Fig. 1, and hence is very thoroughly distributed throughout the drier and the material therein is evenly dried.

Having thus described my invention, what I claim as new, and desire to secure by Letters Patent, is—

1. In a drier, the combination with a drying-chamber, having a suitable inlet and discharge, and provided with rows of perforated stationary hot-air pipes, horizontally arranged in vertical series; of series of reciprocating rakes, whose teeth depend between the said hot-air pipes.

2. In a drier, the combination with a drying-chamber, having a suitable inlet and discharge, of rows of stationary hot-air pipes, horizontally arranged in vertical series, and each pipe being formed with a longitudinal series of minute perforations located between its vertical central and horizontal central planes.

3. In a drier, the combination with a drying-chamber, having a suitable inlet and discharge; of an adjoining hot-air chamber, and a source of supply of hot air leading thereto; and rows of longitudinally-perforated stationary pipes, horizontally arranged in vertical series, across said drying-chamber, and each of said pipes opening at one end into the hot-air chamber and closed at its other end.

4. In a drier, the combination with a drying-chamber having a suitable inlet and discharge; of an adjoining hot-air chamber, and a source of supply of hot air leading thereto; rows of longitudinally-perforated stationary pipes, horizontally arranged in vertical series across said drying-chamber, and communicating with said hot-air chamber, and series of reciprocating rakes, whose teeth depend between the adjacent pipes of each horizontal row.

5. In a drier, the combination with a drying-chamber, having a suitable inlet and discharge, of rows of stationary perforated hot-air pipes, horizontally arranged in vertical series; horizontally-reciprocating rods arranged over said rows of pipes and projecting through the walls of said drying-chamber, transverse strips secured to said rods; teeth secured to said strips, and depending therefrom between said hot-air pipes; eccentric-straps pivotally connected to the adjacent projecting ends of said reciprocating rods; a vertically-arranged revoluble shaft; and series of eccentrics fast on said shaft, and fitted within said eccentric-straps.

6. In a drier, the combination with a drying-chamber, having series of perforated hot-air pipes therein, and a suitable discharge; of an inlet-hopper containing a pair of revoluble cylinders armed with teeth or pins, said cylinders being of different diameters and carrying gears of different diameters in mesh with each other, and one of said cylinders carrying a pulley connected with a power-shaft.

7. In a drier, the combination with a drying-chamber, having a suitable discharge and rows of perforated stationary hot-air pipes horizontally arranged in vertical series across said chamber; of series of horizontally-reciprocating rods arranged over said rows of pipes, and projecting through the walls of said drying-chamber; transverse strips secured to said rods and having teeth depending between the said hot-air pipes; an inlet-hopper at the top of said drying-chamber; a pair of revoluble cylinders, armed with teeth or pins, in said hopper; gears of different diameters, mounted on the journals of said cylinders, and in mesh with each other; a pulley on the journal of one of said cylinders; a horizontally-disposed shaft, having fast thereon a power-pulley, a smaller pulley and a miter-gear; a belt connecting said smaller pulley with the pulley on the journal of the hopper-cylinder; a vertically-arranged shaft carrying a miter-gear in mesh with the gear on the said horizontal shaft; a series of eccentrics fast on said vertical shaft, and series of straps on said eccentrics, pivotally connected to the adjacent projecting ends of the horizontally-reciprocating rods.

In testimony that I claim the foregoing I have hereunto set my hand, at Milwaukee, in the county of Milwaukee and State of Wisconsin, in the presence of two witnesses.

JOHN SCOTT.

Witnesses:
N. E. OLIPHANT,
R. J. BARSCH.